(12) United States Patent
Nishidai

(10) Patent No.: US 8,995,914 B2
(45) Date of Patent: Mar. 31, 2015

(54) VEHICLE PORTABLE DEVICE AND INFORMATION COMMUNICATION SYSTEM

(71) Applicant: Tetsuo Nishidai, Aichi (JP)

(72) Inventor: Tetsuo Nishidai, Aichi (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 226 days.

(21) Appl. No.: 13/681,962

(22) Filed: Nov. 20, 2012

(65) Prior Publication Data

US 2013/0137372 A1 May 30, 2013

(30) Foreign Application Priority Data

Nov. 24, 2011 (JP) ................. 2011-256211

(51) Int. Cl.
H04B 7/00 (2006.01)
H04W 84/18 (2009.01)
H04B 5/00 (2006.01)

(52) U.S. Cl.
CPC ............... *H04W 84/18* (2013.01); *H04B 5/00* (2013.01); *H04B 5/0031* (2013.01)
USPC ............ 455/41.2; 340/438; 340/426.16

(58) Field of Classification Search
USPC ............ 340/5.61, 425.5, 5.64, 5.6, 426.16, 340/426.17, 438; 455/39, 41.2
See application file for complete search history.

(56) References Cited

U.S. PATENT DOCUMENTS 6,917,801 B2 * 7/2005 Witte et al. .................. 455/418
7,778,186 B2 * 8/2010 Oman et al. ................. 340/5.61
7,821,383 B2 * 10/2010 Sultan et al. ............. 340/426.13
8,686,830 B2 * 4/2014 Lehomme ..................... 340/5.61
2013/0099892 A1 * 4/2013 Tucker et al. ................ 340/5.61

FOREIGN PATENT DOCUMENTS

| DE | 102009035654 A1 | 2/2011 |
| JP | H01-252040 A | 10/1989 |
| JP | 2001-288941 A | 10/2001 |
| JP | 2007-046395 A | 2/2007 |
| JP | 2008-144517 A | 6/2008 |
| JP | 2009-239745 A | 10/2009 |
| JP | 2009-257027 A | 11/2009 |
| JP | 2010-038684 A | 2/2010 |

OTHER PUBLICATIONS

Albers et al. (DE 102009035654 A1 machince translation document, pp. 1-8).*

(Continued)

*Primary Examiner* — Sonny Trinh
(74) *Attorney, Agent, or Firm* — Osha Liang LLP

(57) ABSTRACT

A vehicle portable device has a wireless communication part that conducts wireless communication with a vehicle, a short-range wireless communication part that conducts short-range wireless communication with a mobile terminal, a vehicle information acquisition part that acquires vehicle information on the vehicle, wherein the vehicle information is transmitted from the vehicle by wireless communication, a transmission intensity setting part that sets transmission intensity, with which the vehicle information is transmitted to the mobile terminal, according to a content of the vehicle information, and a transmission controller that performs control such that the vehicle information is transmitted to the mobile terminal with the set transmission intensity by short-range wireless communication.

14 Claims, 12 Drawing Sheets

(56) References Cited

OTHER PUBLICATIONS

Office Action issued in counterpart German Patent Application No. 10 2012 111 344.0 dated Feb. 28, 2014 (14 pages).

Office Action in counterpart Japanese Patent Application No. JP2011-256211 issued Dec. 17, 2013 (6 pages).

Patent Abstracts of Japan, Publication No. 2007-046395, Dated Feb. 22, 2007 (1 Page).

Patent Abstracts of Japan, Publication No. 2001-288941, Dated Oct. 19, 2001 (1 Page).

Patent Abstracts of Japan, Publication No. 2010-038684, Dated Feb. 18, 2010 (1 Page).

Patent Abstracts of Japan, Publication No. 2008-144517, Dated Jun. 26, 2008 (1 Page).

* cited by examiner

FIG. 6

| CONTENT OF VEHICLE INFORMATION | SECRET DEGREE (SECRET LEVEL) | TRANSMISSION INTENSITY [COVERAGE OF SIGNAL] |
|---|---|---|
| INFORMATION ON VEHICLE PARKING POSITION | A | LOW [TENS OF CENTIMETERS] |
| LOCK OR UNLOCK STATE OF VEHICLE | A | LOW [TENS OF CENTIMETERS] |
| INFORMATION ON TURN-ON OF LIGHT OF VEHICLE | B | MIDDLE [SEVERAL METERS] |
| CHARGE STATUS OF VEHICLE | B | MIDDLE [SEVERAL METERS] |
| INFORMATION ON SHOCK (THEFT) OF VEHICLE | C | HIGH [SEVERAL METERS TO TENS OF METERS] |
| INFORMATION ON RAIN AROUND VEHICLE | C | HIGH [SEVERAL METERS TO TENS OF METERS] |

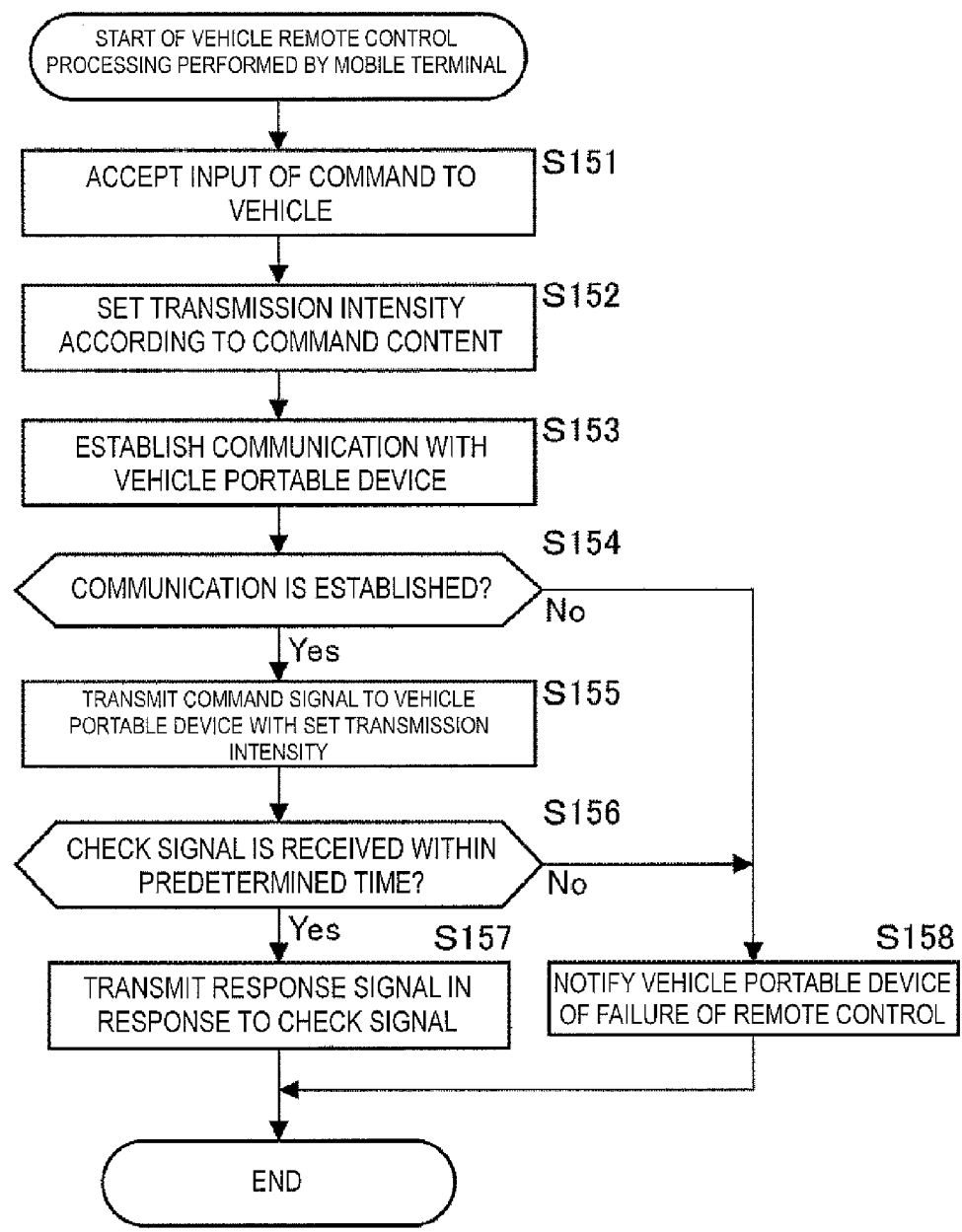

VEHICLE PORTABLE DEVICE AND INFORMATION COMMUNICATION SYSTEM

BACKGROUND

1. Technical Field

The present invention relates to a vehicle portable device and an information communication system, particularly to a vehicle portable device and an information communication system, for notifying a user of information on a vehicle.

2. Related Art

Conventionally, there is proposed that a user can check pieces of vehicle information, such as a vehicle status, or operate the vehicle using mobile terminals, such as a mobile phone.

For example, U.S. Pat. No. 7,821,383 proposes that a vehicle portable device (a portable FOB) possessed by a user conducts middle-range wireless communication with an in-car communication device, conducts short-range wireless communication with a portable communication terminal, and relays transmission of a menu from the in-car communication device to the portable communication terminal and transmission of a menu selection result from the portable communication terminal to the in-car communication device, thereby operating the vehicle from the portable communication terminal.

For example, Japanese Unexamined Patent Publication No. 2007-46395 proposes that a base unit incorporated in the vehicle and the vehicle portable device (an extension handset) conduct the wireless communication with each other to control a vehicle key, the portable communication terminal is connected to the extension handset in a wired manner, information on a setting change is transmitted to the base unit through the extension handset when a user operates a setting change screen displayed on the portable communication terminal, thereby changing the setting of in-car devices.

For example, Japanese Unexamined Patent Publication No. 2001-288941 proposes that an information device transmits and receives various pieces of information to and from the vehicle portable device for locking and unlocking a door of the vehicle and an in-car device that performs various kinds of control to the vehicle by short-range wireless communication, such as Bluetooth (registered trademark), and the vehicle portable device and the in-car device transmit and receive various pieces of information to and from each other by short-range wireless communication, such as Bluetooth.

Japanese Unexamined Patent Publication No. 2010-38684 proposes that a direction or a distance between the vehicle and the vehicle portable device is detected according to received signal intensity between the vehicle and the vehicle portable device and the direction in which the vehicle exists or the distance to the vehicle is displayed on the vehicle portable device.

Japanese Unexamined Patent Publication No. 2008-144517 proposes that the intensity of the signal transmitted from the vehicle portable device (an electronic key) onto a security apparatus on the vehicle side is strengthened. In the proposal of Japanese Unexamined Patent Publication No. 2008-144517, the electronic key transmits an ACK signal having a reference output level when initially receiving a WAKE signal from the security device on the vehicle side, and the electronic key transmits the ACK signal having an output level higher than the reference output level when the security device transmits the WAKE signal again.

Conventionally, because a dedicated algorithm is used in the communication between the vehicle and the vehicle portable device, a third party hardly analyzes the signal to learn a communication content even if the third party intercepts the communication content.

However, in the wireless communication, such as Bluetooth, which is opened to the public, possibly the malicious third party learns the communication content when intercepting the communication content. Particularly, possibly a theft of the vehicle is induced when pieces of high-secret-level information, such as a parking position, leak to the malicious third party.

SUMMARY

One or more embodiments of the present invention improves the security of the communication between the vehicle and the mobile terminal.

In accordance with one or more embodiments of the present invention, a vehicle portable device includes: a wireless communication part that conducts wireless communication with a vehicle; a short-range wireless communication part that conducts short-range wireless communication with a mobile terminal; a vehicle information acquisition part that acquires vehicle information on the vehicle, the vehicle information being transmitted from the vehicle by wireless communication; a transmission intensity setting part that sets transmission intensity, with which the vehicle information is transmitted to the mobile terminal, according to a content of the vehicle information; and a transmission controller that performs control such that the vehicle information is transmitted to the mobile terminal with the set transmission intensity by short-range wireless communication.

In a vehicle portable device in accordance with one or more embodiments of the present invention, the vehicle information transmitted from the vehicle by wireless communication is acquired, the transmission intensity with which the vehicle information is transmitted to the mobile terminal is set according to the content of the vehicle information, and the vehicle information is transmitted to the mobile terminal with the set transmission intensity by short-range wireless communication.

Accordingly, the security of the communication between the vehicle and the mobile terminal can be improved to prevent the vehicle information from leaking to the third party.

According to one or more embodiments of the present invention, the vehicle portable device is constructed by a key fob for the vehicle. According to one or more embodiments of the present invention, the mobile terminal is constructed by a mobile phone, a smartphone, a Personal Digital Assistance (PDA), a portable music player, or a portable game machine. For example, the wireless communication part includes an antenna and a communication device (including a communication chip). According to one or more embodiments of the present invention, the short-range wireless communication part includes an antenna and a communication device (including a communication chip). According to one or more embodiments of the present invention, the vehicle information acquisition part, the transmission intensity setting part, and the transmission controller are constructed by arithmetic processing units, such as a CPU.

According to one or more embodiments of the present invention, the vehicle portable device further includes a storage in which the vehicle information is stored, wherein, when the mobile terminal makes a request to transmit the vehicle information, the vehicle information acquisition part determines whether the requested vehicle information requires an update, acquires the vehicle information that requires the update from the vehicle, and updates the vehicle information stored in the storage, and the transmission controller transmits the vehicle information acquired from the vehicle by the vehicle information acquisition part to the mobile terminal with respect to the vehicle information that requires the update, and transmits the vehicle information stored in the storage to the mobile terminal with respect to the vehicle information that does not require the update.

Therefore, the user can always check the latest vehicle information, the communication amount between the vehicle and the vehicle portable device can be reduced to suppress the power consumption of the vehicle portable device, and the response time until the vehicle information is displayed on the mobile terminal can be shortened.

In a vehicle portable device according to one or more embodiments of the present invention, the vehicle information acquisition part stores the transmission intensity set to the vehicle information in the storage together with the vehicle information, and the transmission controller transmits the vehicle information stored in the storage to the mobile terminal with the transmission intensity stored in the storage.

Therefore, when the vehicle information stored in the storage is transmitted, the processing of setting the transmission intensity can be eliminated to shorten the processing time.

In a vehicle portable device according to one or more embodiments of the present invention, the transmission intensity setting part sets the transmission intensity based on a secret level of the vehicle information.

Therefore, for example, according to the secret level, the vehicle information hardly leaks to the third party or the vehicle information is more securely brought to the mobile terminal.

In a vehicle portable device according to one or more embodiments of the present invention, the transmission controller transmits the plurality of pieces of vehicle information to the mobile terminal at different timing for each group that is classified by the secret level.

Therefore, a frequency of changing the transmission intensity can be reduced.

In a vehicle portable device according to one or more embodiments of the present invention, the transmission intensity setting part sets the transmission intensity of the vehicle information, which is transmitted from the vehicle portable device irrespective of a request from the vehicle portable device, stronger than the transmission intensity of the vehicle information, which is transmitted from the vehicle by the request from the vehicle portable device.

Therefore, the vehicle information transmitted spontaneously from the vehicle can more securely be brought to the mobile terminal.

In a vehicle portable device according to one or more embodiments of the present invention, the transmission intensity setting part sets transmission intensity of information on a position of the vehicle to the weakest.

Therefore, induction of a theft of the vehicle due to the leakage of the positional information on the vehicle to the third party can be prevented.

According to one or more embodiments of the present invention, a vehicle portable device further includes a command relay part that controls transmission of a command to the vehicle, the command being transmitted from the mobile terminal, wherein the transmission intensity setting part sets transmission intensity of a check signal, which is transmitted to the mobile terminal in response to the command, according to a content of the command, the transmission controller transmits the check signal to the mobile terminal with the set transmission intensity, and the command relay part transmits the command to the vehicle when receiving a response signal, which is transmitted from the mobile terminal in response to the check signal.

Therefore, the security of the communication between the vehicle and the mobile terminal can be improved to prevent the third party from performing the remote control of the vehicle.

According to one or more embodiments of the present invention, a command relay part is constructed by arithmetic processing units, such as a CPU.

In accordance with one or more embodiments of the present invention, an information communication system includes: a vehicle portable device that conducts wireless communication with a vehicle; and a mobile terminal that includes a display part and conducts near-field wireless communication with the vehicle portable device, wherein the vehicle portable device includes: a vehicle information acquisition part that acquires vehicle information on the vehicle, the vehicle information being transmitted from the vehicle by wireless communication; a transmission intensity setting part that sets transmission intensity, with which the vehicle information is transmitted to the mobile terminal, according to a content of the vehicle information; and a transmission controller that performs control such that the vehicle information is transmitted to the mobile terminal with the set transmission intensity by short-range wireless communication, and the mobile terminal includes an execution controller that acquires the vehicle information transmitted from the vehicle portable device and controls execution of processing of displaying the vehicle information on the display part.

In an information communication system in accordance with one or more embodiments of the present invention, the vehicle portable device acquires the vehicle information on the vehicle transmitted from the vehicle by wireless communication, sets the transmission intensity with which the vehicle information is transmitted to the mobile terminal according to the content of the vehicle information, and transmits the vehicle information to the mobile terminal with the set transmission intensity by short-range wireless communication, and the mobile terminal acquires the vehicle information transmitted from the vehicle portable device and displays the vehicle information on the display part.

Accordingly, the security of the communication between the vehicle and the mobile terminal can be improved to prevent the vehicle information from leaking to the third party. The vehicle information can be checked with the mobile terminal.

According to one or more embodiments of the present invention, a vehicle portable device is constructed by the key fob for the vehicle. For example, the mobile terminal is constructed by the mobile phone, the smartphone, the Personal Digital Assistance (FDA), the portable music player, or the portable game machine. For example, the vehicle information acquisition part, the transmission intensity setting part, the transmission controller, and the execution controller are constructed by arithmetic processing units, such as a CPU.

In an information communication system according to one or more embodiments of the present invention, a transmission intensity setting part sets the transmission intensity of the vehicle information based on a secret level of the vehicle information, the secret level being transmitted from the vehicle together with the vehicle information.

Therefore, according to one or more embodiments of the present invention, according to the secret level, the vehicle information hardly leaks to the third party or the vehicle information is more securely brought to the mobile terminal.

In an information communication system according to one or more embodiments of the present invention, the mobile terminal further includes an operation part that inputs a command to the vehicle, and the execution controller sets the transmission intensity of the command transmitted to the vehicle portable device based on a content of the command, and transmits the command to the vehicle portable device with the set transmission intensity by short-range wireless communication.

Therefore, the security of the communication between the vehicle and the mobile terminal can be improved to prevent the third party from performing the remote control of the vehicle.

In an information communication system according to one or more embodiments of the present invention, a user can set the transmission intensity of the command from the mobile terminal to the vehicle portable device.

Therefore, the user can adjust the range where the vehicle is remotely controlled using the mobile terminal around the vehicle portable device.

In accordance with one or more embodiments of the present invention, the security of the communication between the vehicle and the mobile terminal is improved.

BRIEF DESCRIPTION OF THE DRAWINGS

FIG. 6 is a view illustrating an example of a transmission intensity table;

FIG. 12 is a flowchart illustrating a second embodiment of the processing when the remote control of the vehicle is performed using the mobile terminal.

DETAILED DESCRIPTION

Hereinafter, embodiments for implementing the present technique (hereinafter referred to as embodiments) will be described. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The description is made as follows.

1. Embodiments
2. Modifications

1. Embodiments 1-1. Configuration Example of Information Communication System

Figure 1:
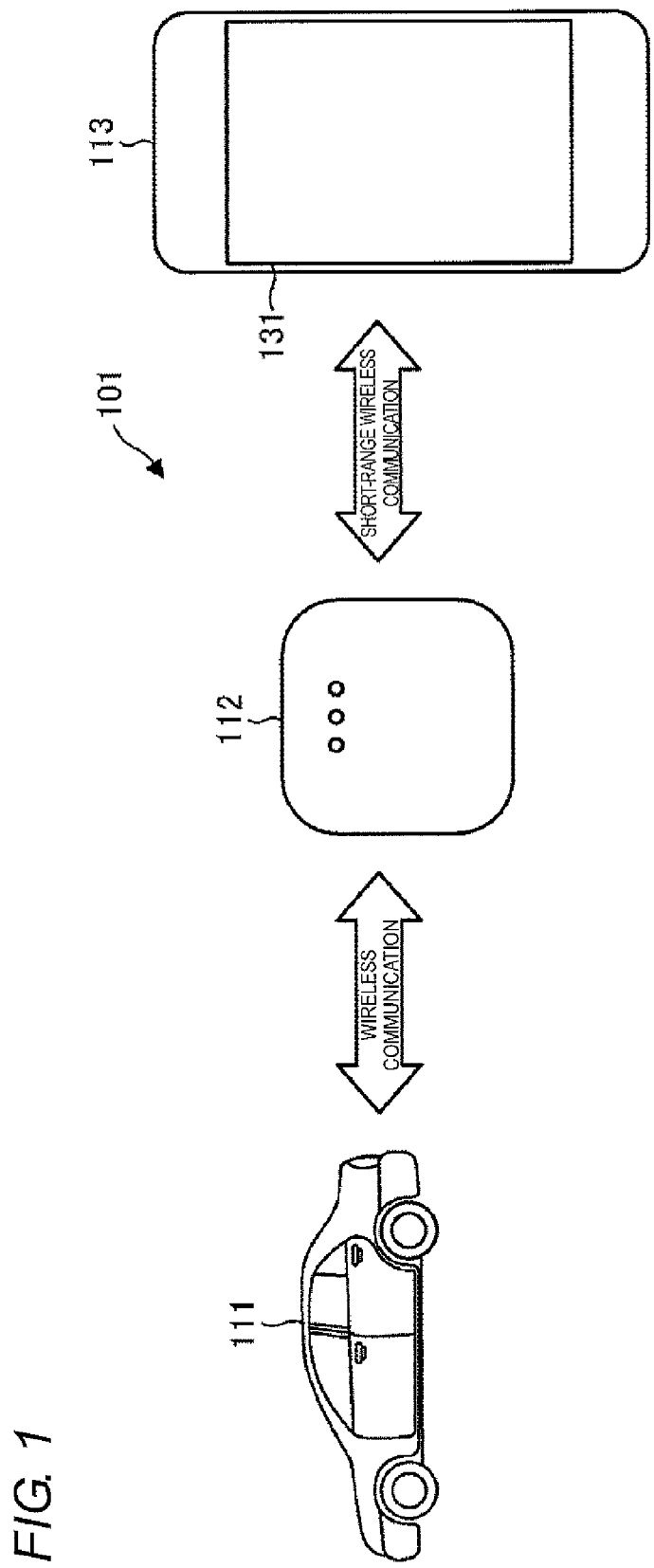
FIG. 1 is a conceptual view illustrating an information communication system according to one or more embodiments of the present invention.

FIG. 1 is a conceptual view illustrating an information communication system 101 for a vehicle according to one or more embodiments of the present invention.

The information communication system 101 includes a vehicle 111, vehicle portable device 112, and a mobile terminal 113.

For example, the vehicle 111 and the vehicle portable device 112 conduct wireless communication by radio wave having an LF (Low Frequency) band or a UHF (Ultra High Frequency) band to transmit and receive various commands and pieces of information to and from each other. For example, an excellent-security, own communication system is adopted as a communication system between the vehicle 111 and the vehicle portable device 112.

For example, the wireless communication is conducted using the LF band in the case where the vehicle portable device 112 transmits a predetermined command signal (for example, entry-system command signals, such as lock and unlock of a door of the vehicle 111) to the vehicle 111, and the wireless communication is conducted using the UHF band in other cases.

The vehicle portable device 112 and the mobile terminal 113 conduct short-range wireless communication, in which a maximum communication distance is about 100 m, to transmit and receive various command and pieces of information to and from each other. A communication system, which is based on general communication standards, such as Bluetooth, and a communication distance can be changed by changing transmission intensity, is adopted as a communication system between the vehicle portable device 112 and the mobile terminal 113.

For example, the vehicle portable device 112 is used as a key fob for the vehicle 111, and has an entry key function in what is called a smart entry system. That is, authentication processing is performed between the vehicle 111 and the vehicle portable device 112 by a trigger such that a switch or a door handle (not illustrated) near the door of the vehicle 111 is operated, or such that the vehicle 111 and the vehicle portable device 112 can conduct communication with each other, and the door of the vehicle 111 is locked or unlocked when the authentication processing is successfully performed.

The vehicle portable device 112 has a function of relaying the communication between the vehicle 111 and the mobile terminal 113. That is, the vehicle portable device 112 can receive a command and information, which are transmitted from the vehicle 111, and transfer the command and the information to the mobile terminal 113, or the vehicle portable device 112 can receive a command and information, which are transmitted from the mobile terminal 113, and transfer the command and the information to the vehicle 111.

The mobile terminal 113 is not limited to a specific kind of the mobile device as long as the mobile terminal 113 can conduct the short-range wireless communication with the vehicle portable device 112, execute a predetermined application program (hereinafter referred to as a vehicle operation support program) for acquiring and displaying the vehicle information and for operating the vehicle 111, and include a display part that displays the vehicle information. For example, the mobile terminal 113 is constructed by a mobile phone, a smartphone, a Personal Digital Assistance (PDA), a portable music player, or a portable game machine.

Hereinafter, the case that the mobile terminal 113 is the smartphone including a display operation part 131 constructed by a touch panel and the like as illustrated in FIG. 1 will be described by way of example.

1-2. Utility form Example of Information Communication System

Figure 2:
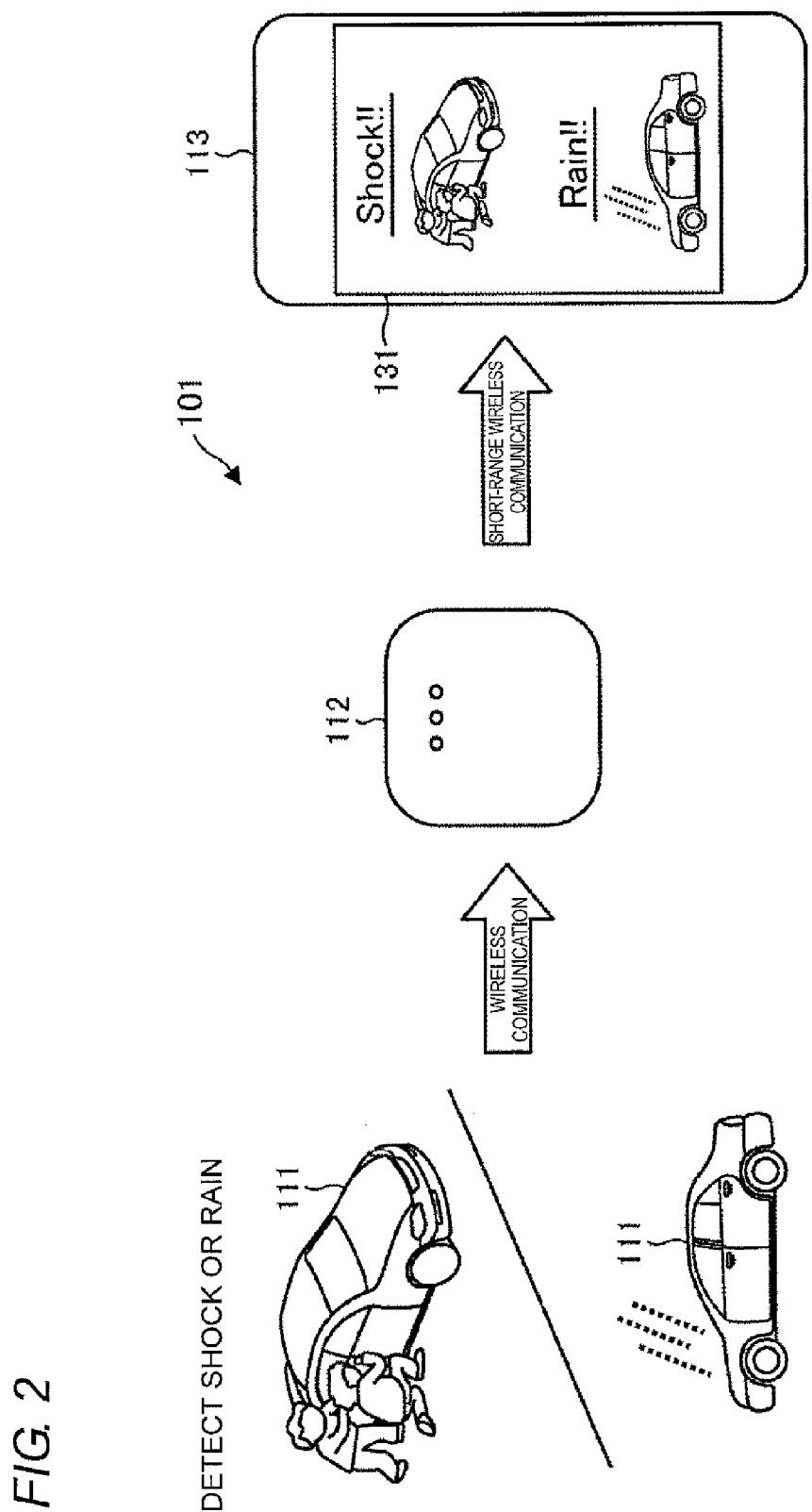
FIG. 2 is a view illustrating a first example of a utility form of the information communication system.
Figure 3:
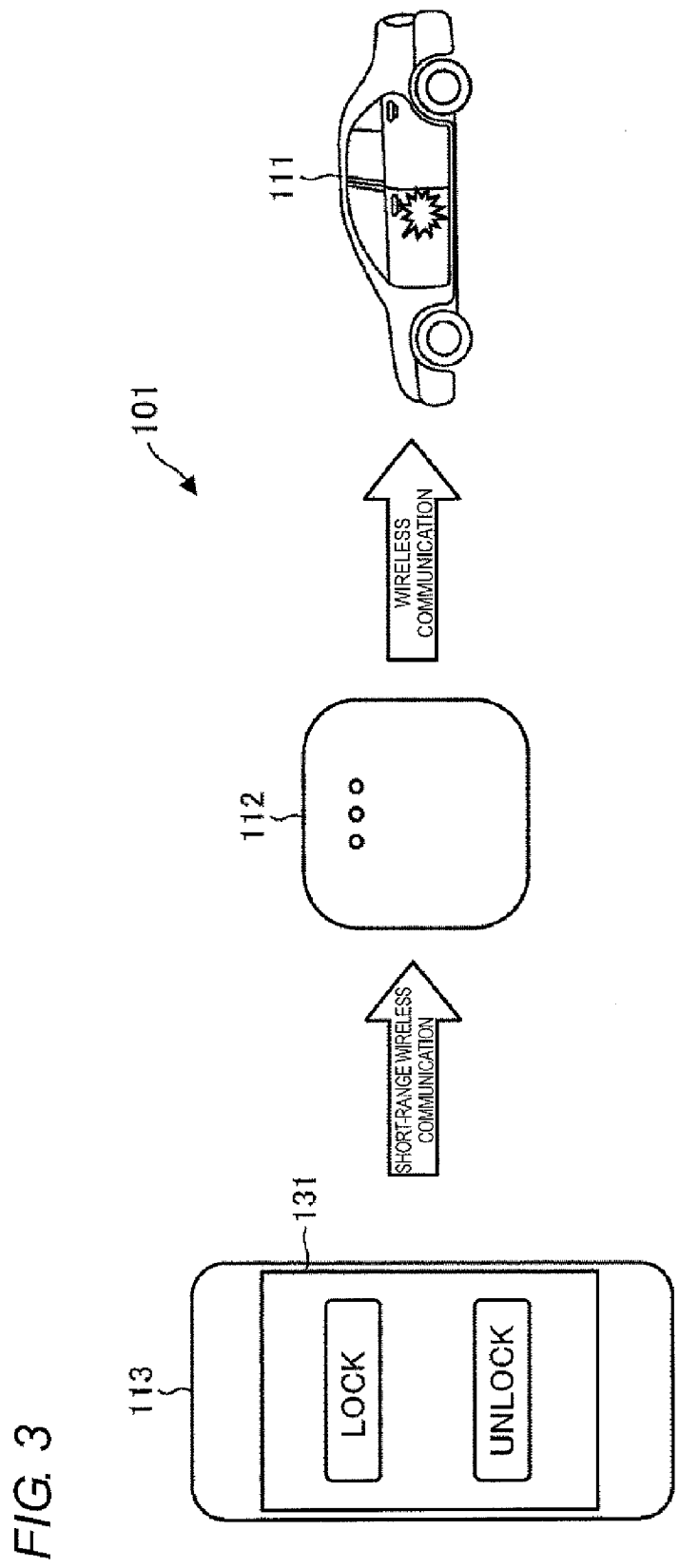
FIG. 3 is a view illustrating a second example of the utility form of the information communication system.

FIGS. 2 and 3 illustrate examples of a utility form of the information communication system 101.

For example, as illustrated in FIG. 2, the information communication system 101 can spontaneously transmit the vehicle information on the vehicle 111 to the mobile terminal 113 from the vehicle 111 through the vehicle portable device 112.

Specifically, the vehicle 111 transmits ID information on the vehicle 111 to the vehicle portable device 112 by wireless communication. The authentication processing is performed between the vehicle 111 and the vehicle portable device 112, and the communication between the vehicle 111 and the vehicle portable device 112 is established. Then the vehicle 111 transmits the vehicle information, which requires to spontaneously notify a user, to the vehicle portable device 112 by wireless communication. The vehicle portable device 112 and the terminal 113 perform the authentication processing. When the authentication processing is successfully performed, the vehicle portable device 112 transmits the vehicle information received from the vehicle 111 to the mobile terminal 113. When receiving the vehicle information, the mobile terminal 113 automatically starts up the vehicle operation support program and displays the received vehicle information on the display operation part 131.

Therefore, for example, in the case where states, such as a shock to the vehicle 111 and rain around the vehicle 111, of which should notify the user, is detected, the information is transmitted from the vehicle 111 to the mobile terminal 113 through the vehicle portable device 112, which allows the user to be rapidly notified of the information.

For example, as illustrated in FIG. 3, the information communication system 101 can perform remote control of the vehicle 111 using the mobile terminal 113.

Specifically, the user operates the mobile terminal 113 to start up the vehicle operation support program, and operates an operation screen displayed on the display operation part 131, thereby inputting a command to the vehicle 111. The mobile terminal 113 transmits the authentication information to the vehicle portable device 112 by short-range wireless communication. When the authentication processing is successfully performed to establish the communication with the vehicle portable device 112, the mobile terminal 113 transmits a command signal including the command inputted by the user to the vehicle portable device 112. The vehicle portable device 112 transmits the authentication information to the vehicle 111 by wireless communication. When the authentication processing is successfully performed to establish the communication with the vehicle 111, the vehicle portable device 112 transmits the command signal to the vehicle 111. The vehicle 111 performs various pieces of processing according to the received command signal.

Therefore, for example, the user can operate the mobile terminal 113 to lock or unlock the door of the vehicle 111 or to acquire the vehicle information from the vehicle 111.

Figure 4:
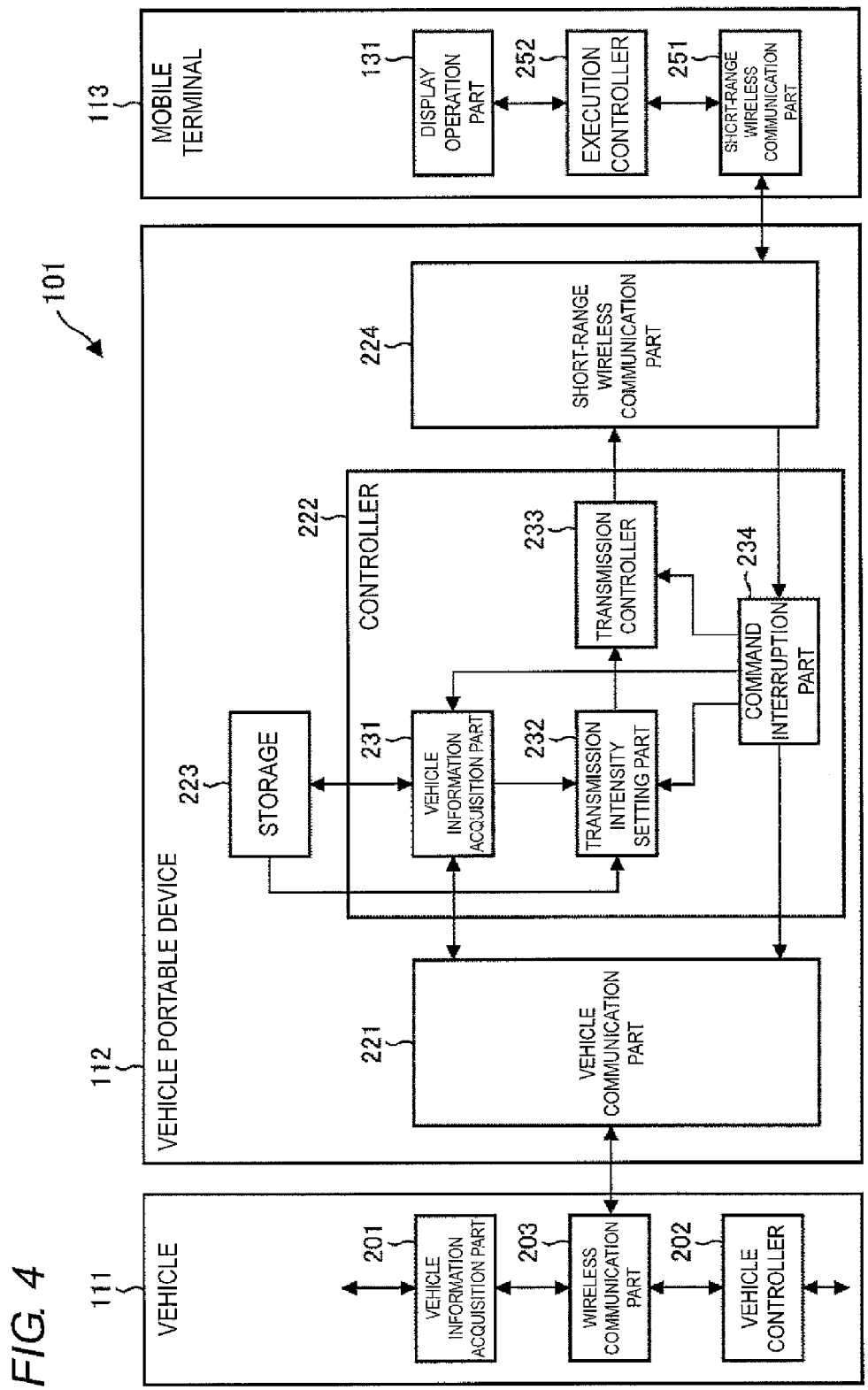
FIG. 4 is a block diagram illustrating a configuration example of a function of each part of the information communication system.

1-3. Configuration Example of Function of each Unit of Information Communication System FIG. 4 is a block diagram illustrating a configuration example of functions of the vehicle 111, the vehicle portable device 112, and the mobile terminal 113.

The vehicle 111 has functions including a vehicle information acquisition part 201, a vehicle controller 202, and a wireless communication part 203.

The vehicle information acquisition part 201 acquires various pieces of information (vehicle information), such as a state of the vehicle 111, from each part of the vehicle 111, and supplies the acquired vehicle information to the wireless communication part 203.

There is no particular limitation to the vehicle information acquired by the vehicle information acquisition part 201. Examples of the vehicle information include a battery charge amount, a remaining amount of fuels, such as gasoline, a door lock state, lighting and turn-off states of various lamps and lights (such as a headlight, a room light, a hazard lamp, and a fog lamp), open and close states of a window, a running distance, a vehicle interior temperature, a parking time, and a parking position.

The vehicle controller 202 includes arithmetic processing units, such as a CPU (Central Processing Unit), or control units, such as an ECU (Electronic Control Unit), and controls each part of the vehicle 111. For example, the vehicle controller 202 controls the lock and unlock of the door of the vehicle 111. The vehicle controller 202 supplies the command and the information, which are transmitted to the vehicle portable device 112, to the wireless communication part 203.

The wireless communication part 203 includes an antenna and a communication device (including a communication chip) and the like, and conducts the wireless communication with a vehicle communication part 221 of the vehicle portable device 112 by a predetermined communication system to transmit and receive various commands and pieces of information to and from each other. The wireless communication part 203 supplies the command and the information, which are acquired from the vehicle portable device 112, to the vehicle information acquisition part 201 and the vehicle controller 202.

The vehicle portable device 112 has functions including a vehicle communication part 221, a controller 222, a storage 223, and a short-range wireless communication part 224.

The vehicle communication part 221 includes an antenna and a communication device (including a communication chip), and conducts the wireless communication with the wireless communication part 203 of the vehicle 111 by a predetermined communication system to transmit and receive various commands and pieces of information to and from each other. The vehicle communication part 221 supplies the vehicle information received from the vehicle 111 to a vehicle information acquisition part 231 of the controller 222.

For example, the controller 223 is constructed by arithmetic processing units, such as a CPU. The controller 223 has functions of the vehicle information acquisition part 231, a transmission intensity setting part 232, a transmission controller 233, and a command relay part 234.

The vehicle information acquisition part 231 supplies the vehicle information, which is supplied from the vehicle communication part 221, to the transmission intensity setting part 232, and stores the vehicle information in the storage 223 together with pieces of information indicating an acquired time, the transmission intensity, and a secret level. The vehicle information acquisition part 231 reads the acquired time information on each piece of vehicle information and update deadline information indicating a update deadline of each vehicle from the storage 223 to determine whether each piece of vehicle information requires an update. The vehicle information acquisition part 231 reads the vehicle information, which is transmitted to the mobile terminal 113, from the storage 223 and supplies the vehicle information to the transmission intensity setting part 232.

The transmission intensity setting part 232 sets the transmission intensity of the vehicle information, which is transmitted to the mobile terminal 113, based on a transmission intensity table stored in the storage 223. The transmission intensity setting part 232 supplies the vehicle information, which is transmitted to the mobile terminal 113, to the transmission controller 233 together with the information indicating the set transmission intensity.

The transmission intensity setting part 232 sets the transmission intensity of a check signal, which is transmitted to the mobile terminal 113 in response to the command to the vehicle 111 from the mobile terminal 113, based on the transmission intensity table stored in the storage 223. The transmission intensity setting part 232 supplies information indicating the transmission intensity of the check signal to the transmission controller 233.

The transmission controller 233 controls the short-range wireless communication part 224 to transmit the vehicle information and check information to the mobile terminal 113 by short-range wireless communication.

The command relay part 234 receives the command to the vehicle 111 from the mobile terminal 113 through the short-range wireless communication part 224, supplies the received command to the vehicle information acquisition part 231, the transmission intensity setting part 232, the transmission controller 233, or the vehicle communication part 221 as needed basis, and controls the transmission of the command to the vehicle 111.

The vehicle information acquired from the vehicle 111 is stored in the storage 223 together with the pieces of information on the acquired time, the transmission intensity, and the secret level. The transmission intensity table used to set the transmission intensity of the vehicle information or the check signal and the update deadline information are stored in the storage 223.

A specific example of the transmission intensity table will be described later with reference to FIG. 6.

The short-range wireless communication part 224 includes an antenna and a communication device (including a communication chip), and conducts the short-range wireless communication with a short-range wireless communication part 251 of the mobile terminal 113 by a predetermined communication system to transmit and receive various commands and pieces of information to and from each other. The short-range wireless communication part 224 supplies the command and the information, which are received from the mobile terminal 113, to the command relay part 234.

The mobile terminal 113 has functions including the short-range wireless communication part 251 and an execution controller 252 in addition to the display operation part 131 in FIG. 1.

The short-range wireless communication part 251 includes an antenna and a communication device (including a communication chip), and conducts the short-range wireless communication with the short-range wireless communication part 224 of the mobile terminal 113 by a predetermined communication system to transmit and receive various commands and pieces of information to and from each other. The short-range wireless communication part 251 supplies the command and the information, which are received from the vehicle portable device 112, to the execution controller 252.

The execution controller 252 includes arithmetic processing units, such as a CPU, and executes the vehicle operation support program to display the vehicle information, which is acquired from the vehicle 111 through the vehicle portable device 112, on the display operation part 131. The execution controller 252 supplies the command and the information, which are transmitted to the vehicle 111 or the vehicle portable device 112, to the short-range wireless communication part 251.

The display operation part 131 displays various pieces of information including the vehicle information and an operation screen. The display operation part 131 is used to input the command to the vehicle 111 or the mobile terminal 113, and supplies the inputted command to the execution controller 252.

1-4. Processing of Information Communication System

Pieces of processing of the information communication system 101 will be described below with reference to FIGS. 5 to 12.

(vehicle Information Relay Processing Performed by Vehicle Portable Device when Vehicle Spontaneously Transmits Vehicle Information)

Vehicle information relay processing, which is performed by the vehicle portable device 112 when the vehicle 111 spontaneously transmits the vehicle information, will be described with reference to a flowchart in FIG. 5.

In Step S1, the vehicle communication part 221 establishes the communication with the vehicle 111. Specifically, when acquiring the vehicle information, which is previously prescribed so as to be spontaneously transmitted, the vehicle information acquisition part 201 of the vehicle 111 issues a command to the wireless communication part 203 to transmit the vehicle information. The wireless communication part 203 transmits a signal including the authentication information to the vehicle portable device 112 in order to establish the communication with the vehicle portable device 112.

After the vehicle communication part 221 of the vehicle portable device 112 receives the signal from the vehicle 111, the authentication processing is performed between the wireless communication part 203 and the vehicle communication part 221 according to a predetermined protocol, and the wireless communication is established between the wireless communication part 203 and the vehicle communication part 221 when all the pieces of processing are successfully performed.

In Step S2, the vehicle communication part 221 determines whether the communication with the vehicle 111 is established. When the communication with the vehicle 111 is established, the processing proceeds to Step S3.

In Step S3, the vehicle information acquisition part 231 receives the transmission signal including the vehicle information, which is spontaneously transmitted from the vehicle 111, through the vehicle communication part 221.

In Step S4, the vehicle information acquisition part 231 updates the vehicle information stored in the storage 223. Specifically, the vehicle information acquisition part 231 replaces the old vehicle information stored in the storage 223 with the vehicle information received newly from the vehicle 111, and updates the acquired time information indicating the time the vehicle information is acquired. The vehicle information that has not been stored in the storage 223 yet is directly stored in the storage 223 together with the acquired time information.

In Step S5, the transmission intensity setting part 232 determines a secret degree of the vehicle information to be transmitted. Specifically, the vehicle information acquisition part 231 supplies the vehicle information acquired from the vehicle 111 to the transmission intensity setting part 232. The transmission intensity setting part 232 reads the transmission intensity table from the storage 223.

FIG. 6 illustrates an example of the transmission intensity table. The transmission intensity table includes three items, namely, a content of the vehicle information, the secret degree indicating a secret level of the vehicle information, and the transmission intensity.

In the example in FIG. 6, the secret degree is set to three stages, namely, A to C, and A is the highest secret degree while C is the lowest secret degree.

For example, the pieces of vehicle information, such as information on a parking position of the vehicle 111 (information on a position of the vehicle 111) and the lock and unlock states of the vehicle 111, which require to be securely prevented from leaking to the third party due to induction of a theft of the vehicle 111, are set to the highest secret degrees A. For example, the pieces of vehicle information, such as information on a shock (the theft) of the vehicle 111 and information on rain around the vehicle 111, which do not become troublesome too much even if the pieces of vehicle information leak to the third party, are set to the lowest secret degrees C. For example, the pieces of vehicle information, such as information on turn-on of a light of the vehicle 111 and a charge status of the vehicle 111, which require the secret level between the secret degrees A and C, are set to the middle secret degrees of B.

In the example in FIG. 6, the transmission intensity is set according to the secret degree of the vehicle information.

Figure 7:
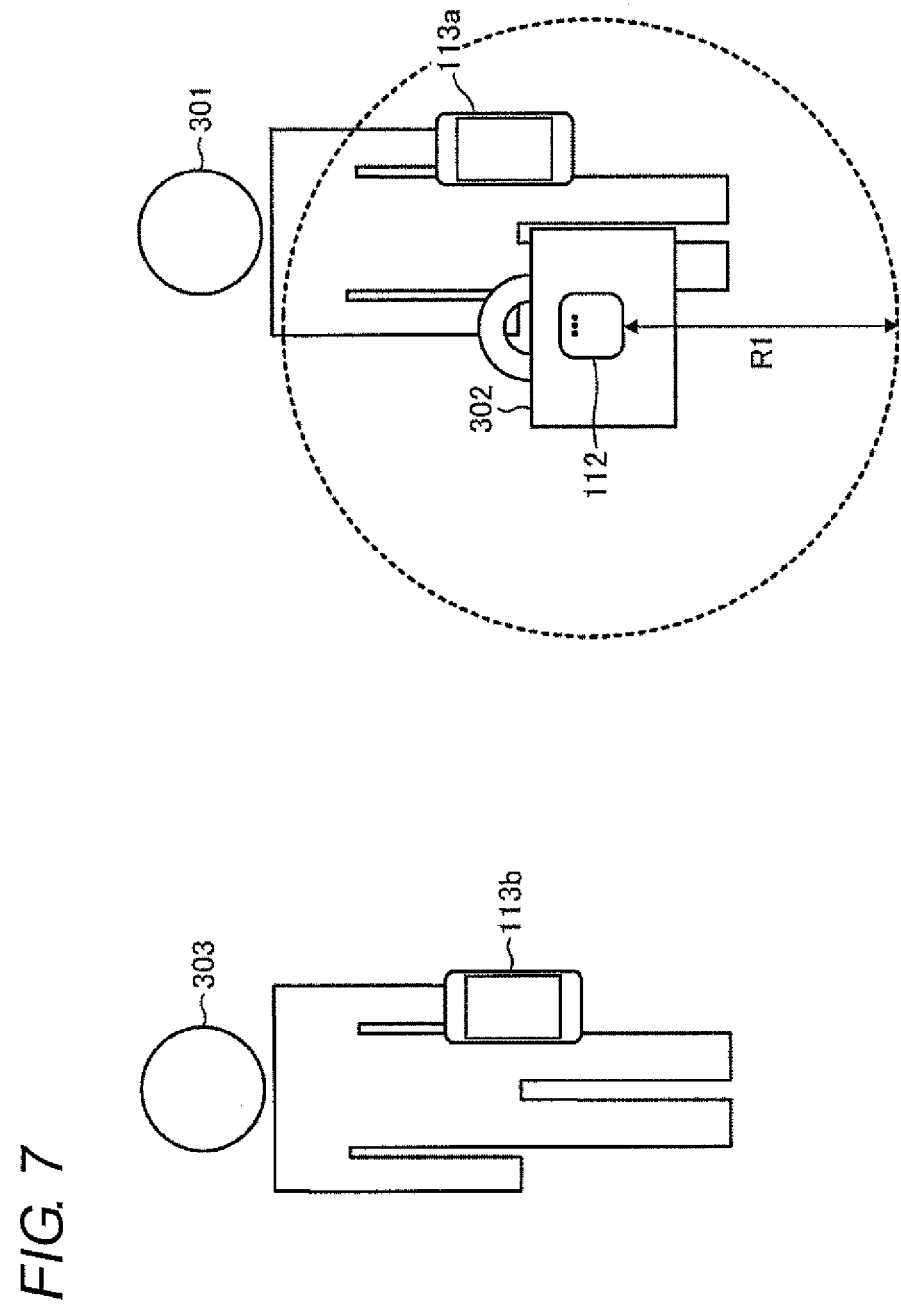
FIG. 7 is a view illustrating a specific example of transmission intensity.

For example, the transmission intensity of the vehicle information having the secret degree A is set to the weakest level at which coverage of the signal is tens of centimeters. Therefore, for example, as illustrated in FIG. 7, the vehicle information transmitted from the vehicle portable device 112 in a bag 302 possessed by a user 301 reaches a mobile terminal 113a of the user 301 located within a radius R1 while not reaching a mobile terminal 113b of a third party 303. Accordingly, even if the third party 303 tries to intercept the vehicle information, the third party 303 cannot receive the vehicle information transmitted from the vehicle portable device 112 using the mobile terminal 113b. When the third party 303 forcibly tries to receive the vehicle information, it is necessary for the third party 303 to come close to the user 301. Therefore, the user 301 can notice a suspicious behavior of the third party 303. Thus, the vehicle information can be prevented from leaking to the third party 303.

Figure 8:
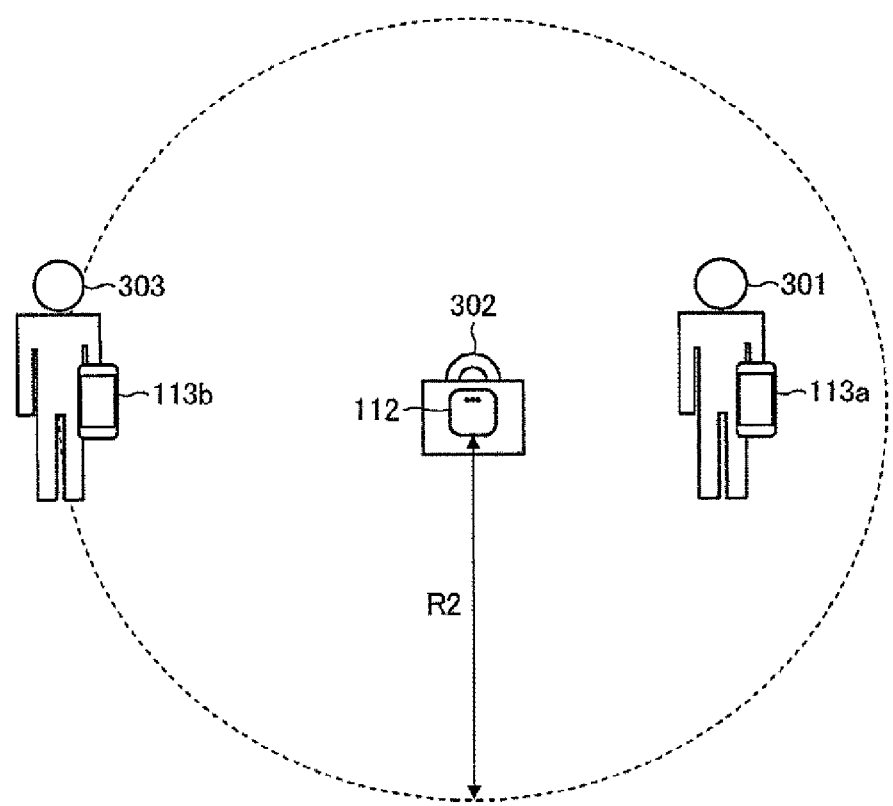
FIG. 8 is a view illustrating a specific example of the transmission intensity.

On the other hand, the transmission intensity of the vehicle information having the secret degree C. is set to the strongest level at which the coverage of the signal ranges from several meters to tens of meters. Therefore, for example, as illustrated in FIG. 8, the vehicle information transmitted from the vehicle portable device 112 in the bag 302 possessed by the user 301 reaches both the mobile terminal 113a of the user 301 and the mobile terminal 113b of the third party 303, which are located within a radius R2.

Accordingly, although the vehicle information having the secret degree C. has a higher possibility that the vehicle information leaks to the third party 303 compared with the vehicle information having the secret degree A, a problem is not particularly generated because of the low secret degree. On the other hand, because the vehicle information having the secret degree C. outreaches the vehicle information having the secret degree A, the vehicle information can be transmitted to the mobile terminal 113 even if the vehicle portable device 112 is located far away from the mobile terminal 113a. Therefore, the user 301 can rapidly and securely be notified of the vehicle information.

The transmission intensity of the vehicle information having the secret degree B is set to the middle level between the secret degrees A and C, at which the coverage of the signal is several meters.

The transmission intensity setting part 232 determines the secret degree of each piece of vehicle information transmitted to the mobile terminal 113 based on the content of the vehicle information and the transmission intensity table.

In Step S6, the transmission intensity setting part 232 classifies the vehicle information to be transmitted into secret degrees. For example, the vehicle information to be transmitted is classified into a group of the pieces of vehicle information having the secret degree A, a group of the pieces of vehicle information having the secret degree B, and a group of the pieces of vehicle information having the secret degree C.

In Step S7, the transmission intensity setting part 232 sets the transmission intensity of each group according to the secret degree based on the transmission intensity table. The transmission intensity setting part 232 notifies the transmission controller 233 of the vehicle information transmitted to the mobile terminal 113 together with the information indicating the classified group and the information indicating the transmission intensity.

At this point, at least one of the secret degree of each piece of vehicle information and the transmission intensity may be stored in the storage 223 while correlated with each of the vehicle information. In this case, the vehicle information may be stored in the storage 223 after the secret degree or the transmission intensity is obtained.

In Step S8, the short-range wireless communication part 224 establishes the communication with the mobile terminal 113. Specifically, the transmission controller 233 issues a command to the short-range wireless communication part 224 to transmit the vehicle information. The short-range wireless communication part 224 tries to establish the short-range wireless communication with the short-range wireless communication part 251 of the mobile terminal 113. The authentication processing is performed between the short-range wireless communication part 224 and the short-range wireless communication part 251 according to a predetermined protocol, and the communication is established between the short-range wireless communication part 224 and the short-range wireless communication part 251 when all the pieces of processing are successfully performed.

In Step S9, the short-range wireless communication part 224 determines whether the communication with the mobile terminal 113 is established. When the communication with the mobile terminal 113 is established, the processing proceeds to Step S10.

In Step S10, the transmission controller 233 transmits the vehicle information through the short-range wireless communication part 224 at the transmission intensity that is set for each group. For example, the transmission controller 233 generates the transmission signal including the pieces of vehicle information of the group having the secret degree A, and causes the short-range wireless communication part 224 to transmit the generated transmission signal with the transmission intensity that is set for the group. The transmission controller 233 performs the processing for each group. Therefore, the vehicle information is transmitted from the vehicle portable device 112 to the mobile terminal 113 for each group at different timing with different transmission intensity. The group of the pieces of vehicle information is transmitted in any sequence.

The execution controller 252 of the mobile terminal 113 receives the transmission signal, which is transmitted from the vehicle portable device 112, through the short-range wireless communication part 251. The execution controller 252 starts up the vehicle operation support program, and displays the acquired vehicle information on the display operation part 131 as described above with reference to FIG. 2.

Then the processing is ended.

On the other hand, when it is not determined that the communication with the mobile terminal 113 is established in Step S9, the processing in Step S10 is skipped, and the processing is ended. That is, the vehicle information is not transmitted to the mobile terminal 113.

When it is not determined that the communication with the vehicle 111 is established in Step S2, the pieces of processing in Steps S3 to S10 are skipped, and the processing is ended. That is, the vehicle information is not received from the vehicle 111, and the vehicle information is not transmitted to the mobile terminal 113.

Thus, the user can check the vehicle information, which is transmitted spontaneously from the vehicle 111, using the mobile terminal 113.

Even if the short-range wireless communication having a general communication system is used between the vehicle portable device 112 and the mobile terminal 113, the security of the communication between the vehicle 111 and the mobile terminal 113 is improved to prevent the vehicle information having the high secret degree from leaking to the third party.

Additionally, the consumed power of the vehicle portable device 112 can be suppressed because the vehicle information is not displayed on the vehicle portable device 112.

(Vehicle Information Relay Processing Performed by Vehicle Portable Device when Mobile Terminal makes Inquiry)

Then the vehicle information relay processing, which is performed by the vehicle portable device 112 when the mobile terminal 113 makes an inquiry, will be described with reference to a flowchart in FIG. 9.

In Step S51, the vehicle portable device 112 establishes the communication with the mobile terminal 113. Specifically, for example, the user operates the display operation part 131 of the mobile terminal 113 to start up the vehicle operation support program, and performs an operation to inquire the pieces of vehicle information, such as the state of the vehicle 111. The execution controller 252 acquires the inquiry command from the user from the display operation part 131, and issues a command to the short-range wireless communication part 251 to transmit the inquiry command.

The short-range wireless communication part 251 of the mobile terminal 113 tries to establish the short-range wireless communication with the short-range wireless communication part 224 of the vehicle portable device 112. The authentication processing is performed between the short-range wireless communication part 224 and the short-range wireless communication part 251 according to the predetermined protocol, and the communication is established between the short-range wireless communication part 224 and the short-range wireless communication part 251 when all the pieces of processing are successfully performed.

In Step S52, the short-range wireless communication part 224 determines whether the communication with the mobile terminal 113 is established. When the communication with the mobile terminal 113 is established, the processing proceeds to Step S53.

In Step S53, the command relay part 234 receives the inquiry from the mobile terminal 113. Specifically, the short-range wireless communication part 251 of the mobile terminal 113 transmits the inquiry signal including the inquiry from the user to the vehicle portable device 112.

The command relay part 234 of the vehicle portable device 112 receives the inquiry signal, which is transmitted from the mobile terminal 113, through the short-range wireless communication part 224 and supplies the inquiry signal to the vehicle information acquisition part 231.

In Step S54, the vehicle information acquisition part 231 acquires current time information from a timer (not illustrated).

In Step S55, the vehicle information acquisition part 231 checks an elapsed time since the vehicle information to be transmitted to the mobile terminal 113 is acquired. Specifically, the vehicle information acquisition part 231 reads the acquired time information from the storage 223 with respect to each piece of vehicle information, which is transmitted in response to the inquiry from the mobile terminal 113. The vehicle information acquisition part 231 calculates the elapsed time until the current time since each piece of vehicle information is acquired.

In Step S56, the vehicle information acquisition part 231 compares the elapsed time of each piece of vehicle information to the update deadline. Specifically, the vehicle information acquisition part 231 reads the update deadline information indicating the update deadline of each piece of vehicle information from the storage 223. The vehicle information acquisition part 231 compares the elapsed time of each piece of vehicle information to the update deadline.

For example, the update deadline of each piece of vehicle information is previously set for each piece of vehicle information based on an important degree or a characteristic of the information. For example, update deadlines of the vehicle information, such as a weather around the vehicle 111, which change momentarily, are set short. On the other hand, for example, update deadlines of the vehicle information, such as a battery remaining amount of the vehicle 111, which change moderately, are set longer. For example, update deadlines of the vehicle information, such as the lock state of the door of the vehicle 111, which do not change unless a user boards on or drives the vehicle 111, are set to an indefinite period. Alternatively, for example, the update deadline of the important vehicle information in which correctness is required is set short, and the update deadline of the vehicle information in which the correctness is not required too much is set long.

In Step S57, the vehicle information acquisition part 231 determines whether the vehicle information that requires the update exists based on a result of the processing in Step S55. When the vehicle information that requires the update exists, the processing proceeds to Step S58.

The vehicle information that requires the update includes the vehicle information that is not stored in the storage 223 in addition to the vehicle information in which the elapsed time is past the update deadline.

In Step S58, the vehicle portable device 112 makes a request to the vehicle 111 to transmit the vehicle information that requires the update. Specifically, the vehicle information acquisition part 231 commands the vehicle communication part 221 to transmit the request signal for making the request to transmit the vehicle information that requires the update.

The vehicle communication part 221 tries to establish the wireless communication with the wireless communication part 203 of the vehicle 111. The authentication processing is performed between the wireless communication part 203 and the vehicle communication part 221 according to a predetermined protocol, and the wireless communication is established between the wireless communication part 203 and the vehicle communication part 221 when all the pieces of processing are successfully performed. When the wireless communication is established between the wireless communication part 203 and the vehicle communication part 221, the vehicle communication part 221 transmits the request signal to the wireless communication part 203 of the vehicle 111.

In Step S59, the vehicle information acquisition part 231 determines whether the vehicle information is received within a predetermined time. Specifically, when receiving the request signal from the vehicle communication part 221 through the wireless communication part 203, the vehicle information acquisition part 201 of the vehicle 111 acquires the requested vehicle information from each part of the vehicle 111. The vehicle information acquisition part 201 transmits the transmission signal including the acquired vehicle information to the vehicle portable device 112 through the wireless communication part 203.

When the vehicle information acquisition part 231 receives the transmission signal transmitted from the vehicle 111 through the vehicle communication part 221 within the predetermined time since the transmission of the vehicle information that requires the update is requested, the processing proceeds to Step S60.

In Step S60, the vehicle information stored in the storage 223 is updated similarly to the processing in Step S4 in FIG. 4.

Then the processing proceeds to Step S61.

On the other hand, when it is not determined that the vehicle information is received from the vehicle 111 within the predetermined time in Step S59, the processing in Step S60 is skipped, and the processing proceeds to Step S61. For example, the vehicle information is not received within the predetermined time, when the vehicle 111 does not exist within a communication range of the vehicle portable device 112, when the communication is not established between the vehicle 111 and the vehicle portable device 112 due to an authentication error, or when a communication error is generated in midstream.

When the vehicle information that requires the update does not exist in Step S57, the pieces of processing in Steps S58 to S60 are skipped, and the processing proceeds to Step S61.

In Step S61, the vehicle information acquisition part 231 reads the vehicle information, which is transmitted to the mobile terminal 113, from the storage 223 as needed basis. Specifically, in all the pieces of vehicle information transmitted to the mobile terminal 113, the vehicle information acquisition part 231 reads the vehicle information that does not require the update and the vehicle information, which cannot be acquired from the vehicle 111 although the vehicle information requires the update, from the storage 223.

Figure 5:
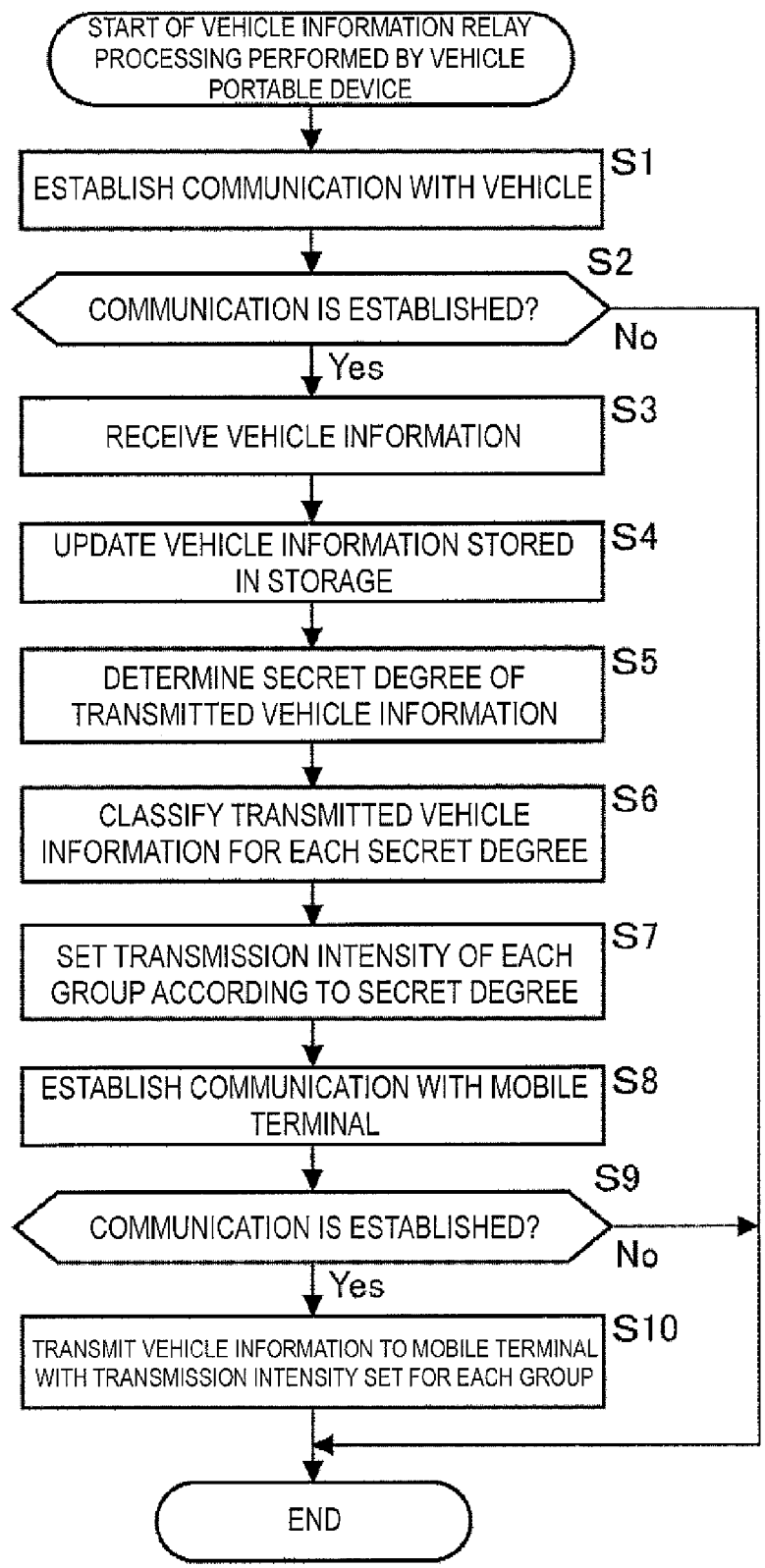
FIG. 5 is a flowchart illustrating a first embodiment of vehicle information relay processing performed by a vehicle portable device.

The same pieces of processing as those in Steps S6 to S8 in FIG. 5 are performed in Steps S62 to S64, and the same processing as that in Step 310 in FIG. 5 is performed in Step S65. Then the processing is ended.

On the other hand, when the communication with the mobile terminal 113 is not established in Step S52, the processing is ended.

Thus, the user can make the inquiry from the mobile terminal 113 to easily check the vehicle information on the vehicle 111.

Even if the short-range wireless communication having a general communication system is adopted between the vehicle portable device 112 and the mobile terminal 113, the security of the wireless communication between the vehicle 111 and the mobile terminal 113 is improved to prevent the vehicle information having the high secret degree from leaking to the third party.

Additionally, the consumed power of the vehicle portable device 112 can be suppressed because the vehicle information is not displayed on the vehicle portable device 112.

Only the vehicle information that requires the update is acquired from the vehicle 111, and the vehicle information stored in the vehicle portable device 112 is transmitted to the mobile terminal 113 in any other cases. Therefore, the user can always check the latest vehicle information, the communication amount between the vehicle 111 and the vehicle portable device 112 can be reduced to suppress the power consumption of the vehicle portable device 112, and the response time until the vehicle information is displayed on the mobile terminal 113 can be shortened.

In the case where the vehicle portable device 112 cannot conduct the wireless communication with the vehicle 111 to acquire the vehicle information from the vehicle 111 within the predetermined time, the vehicle portable device 112 does not perform retry, but transmits the vehicle information stored in the own vehicle portable device 112 to the mobile terminal 113. Therefore, the power consumption of the vehicle portable device 112 can be suppressed.

(Processing in which Remote Control of Vehicle is Performed Using Mobile Terminal)

Then processing in which the vehicle 111 is remotely controlled using the mobile terminal 113 will be described with reference to a flowchart in FIG. 11.

In Step S101, the mobile terminal 113 accepts the input of the command to the vehicle 111. For example, when the user performs a predetermined operation to the display operation part 131 of the mobile terminal 113, the execution controller 252 starts up the vehicle operation support program, and displays the operation screen on the display operation part 131 in order to input the command to the vehicle 111 as described above with reference to FIG. 3. The user inputs the command to the vehicle 111 by operating the operation screen displayed on the display operation part 131. The execution controller 252 acquires the inputted command from the display operation part 131, and issues a command to the short-range wireless communication part 251 to transmit the command signal including the inputted command.

Figure 9:
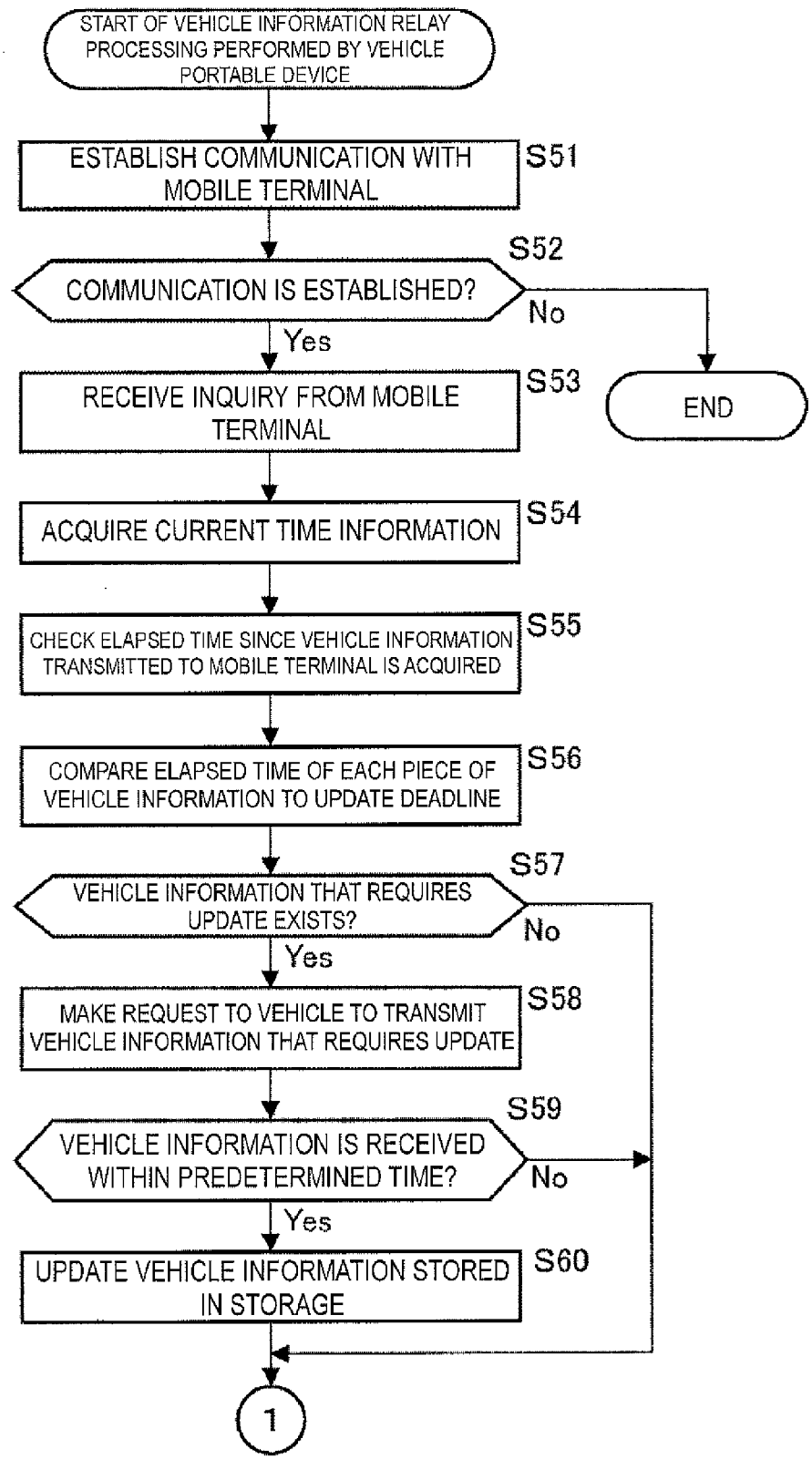
FIG. 9 is a flowchart illustrating a second embodiment of the vehicle information relay processing performed by the vehicle portable device.

In Step S102, similarly to the processing in Step S51 in FIG. 9, the short-range wireless communication is established between the short-range wireless communication part 224 of the vehicle portable device 112 and the short-range wireless communication part 224 of the mobile terminal 113

In Step S103, the short-range wireless communication part 251 of the mobile terminal 113 determines whether the communication is established. When the communication is established, the processing proceeds to Step S104.

In Step S104, the short-range wireless communication part 251 of the mobile terminal 113 transmits the command signal to the vehicle portable device 112 with predetermined transmission intensity. At this point, the transmission intensity is fixed irrespective of the command content.

In Step S105, the command relay part 234 of the vehicle portable device 112 receives the command signal, which is transmitted from the mobile terminal 113, through the short-range wireless communication part 224. The command relay part 234 supplies the received command signal to the transmission intensity setting part 232 and the transmission controller 233.

In Step S106, the transmission intensity setting part 232 of the vehicle portable device 112 sets the transmission intensity of the check signal according to the command content. Specifically, the transmission intensity setting part 232 checks the content of the command to the vehicle 111, which is included in the command signal. The transmission intensity setting part 232 reads the transmission intensity table indicating a correspondence relationship between the command content and the transmission intensity of the check signal from the storage 223. The transmission intensity setting part 232 sets the transmission intensity of the check signal based on the command content and the transmission intensity table, and notifies the transmission controller 233 of the set transmission intensity.

For example, the transmission intensity of the check signal is set based on a degree of necessity to prevent the third party from performing the remote control of the vehicle 111. For commands, such as the lock and unlock of the door of the vehicle 111 and engine starting, which have the high degree of the necessity to prevent the third party from performing the remote control, the transmission intensity of the check signal is set weak. On the other hand, for commands, such as the acquisition of the vehicle information, which have the low degree of the necessity to prevent the third party from performing the remote control, the transmission intensity of the check signal is set strong.

In Step S107, the short-range wireless communication part 224 of the vehicle portable device 112 transmits the check signal with the set transmission intensity under the control of the transmission controller 233.

In Step S108, the short-range wireless communication part 251 of the mobile terminal 113 determines whether the check signal is received within a predetermined time. When the short-range wireless communication part 251 receives the check signal from the vehicle portable device 112 within the predetermined time since the command signal is transmitted, the processing proceeds to Step S109.

In Step S109, the short-range wireless communication part 251 of the mobile terminal 113 transmits a response signal to the vehicle portable device 112 in response to the check signal. For example, the transmission intensity of the response signal is set to the same transmission intensity of the command signal.

In Step S110, the short-range wireless communication part 224 of the vehicle portable device 112 determines whether the response signal is received within a predetermined time. When the short-range wireless communication part 224 receives the response signal from the mobile terminal 113 within the predetermined time since the check signal is transmitted, the processing proceeds to Step S111.

In Step S111, the vehicle portable device 112 issues the command to the vehicle 111. For example, the command relay part 234 of the vehicle portable device 112 transmits the command signal received from the mobile terminal 113 to the vehicle 111 through the vehicle communication part 221. The vehicle 111 performs the processing based on the command.

Figure 10:
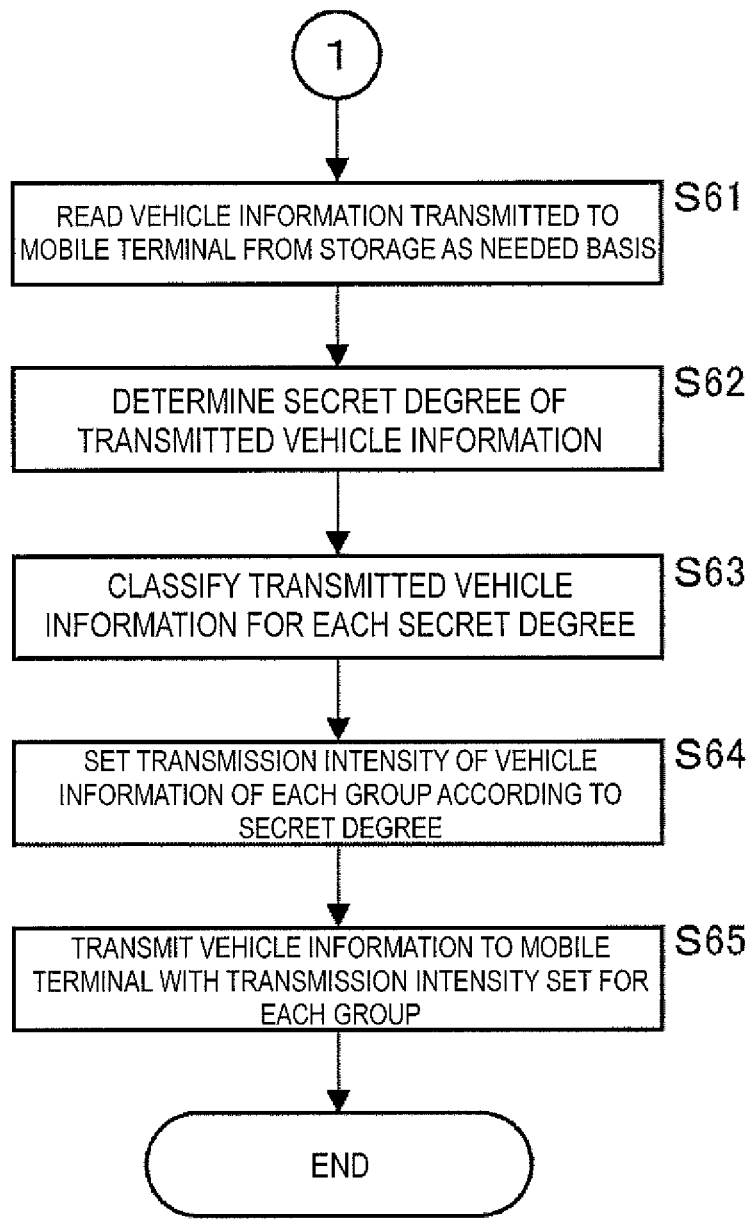
FIG. 10 is a flowchart illustrating the second embodiment of the vehicle information relay processing performed by the vehicle portable device.

Alternatively, for example, in the case where the command content is the inquiry of the vehicle information, the command relay part 234 supplies the command signal to the vehicle information acquisition part 231. The pieces of processing above described in FIGS. 9 and 10 are performed.

Then the processing of the vehicle portable device 112 is ended.

On the other hand, when the response signal is not received within the predetermined time in Step S110, the processing in Step S111 is skipped, and the processing of the vehicle portable device 112 is ended. That is, when the vehicle portable device 112 fails to receive the response signal from the mobile terminal 113, the command from the mobile terminal 113 is canceled, but the command to the vehicle 111 is not performed.

On the other hand, when the mobile terminal 113 does not receive the check signal within the predetermined time in Step S108, the processing proceeds to Step S112.

When it is not determined that the communication between the vehicle portable device 112 and the mobile terminal 113 is established in Step S103, the processing proceeds to Step S112.

In Step S112, the mobile terminal 113 notifies the vehicle portable device 112 of the failure of the remote control. Specifically, the short-range wireless communication part 251 notifies the execution controller 252 that a communication error occurs between the mobile terminal 113 and the vehicle portable device 112. The execution controller 252 displays the screen on the display operation part 131 in order to notify the vehicle portable device 112 of the failure of the remote control.

Then the processing of the mobile terminal 113 is ended.

Thus, for the operation having the high necessary to prevent the third party from performing the remote control, the transmission intensity of the check signal from the vehicle portable device 112 is weakened to narrowly set the operable range around the vehicle portable device 112. Accordingly, even if the third party acquires the authentication information of the mobile terminal 113 or the authentication information between the vehicle portable device 112 and the mobile terminal 113, the third party cannot perform the remote control unless the third party possesses the vehicle portable device 112.

On the other hand, for the operation having the low necessary to prevent the third party from performing the remote control, the transmission intensity of the check signal from the vehicle portable device 112 is strengthened to widely set the operable range around the vehicle portable device 112. Accordingly, the user can perform the remote control from a position distant from the vehicle portable device 112 to some extent, and the convenience of the user is improved.

The check from the vehicle portable device 112 to the mobile terminal 113 (Steps S106 to S111) may be eliminated.

The method can be performed even if the mobile terminal 113 does not have the function of changing the transmission intensity of the short-range wireless communication.

In the case where the mobile terminal 113 has the function of changing the transmission intensity of the short-range wireless communication, the operable range may be adjusted such that the transmission intensity of the command signal transmitted from the mobile terminal 113 is changed according to the command content.

Vehicle remote control processing, which is performed by the mobile terminal 113 when the transmission intensity of the command signal transmitted from the mobile terminal 113 is changed according to the command content, will be described with reference to a flowchart in FIG. 12.

Figure 11:
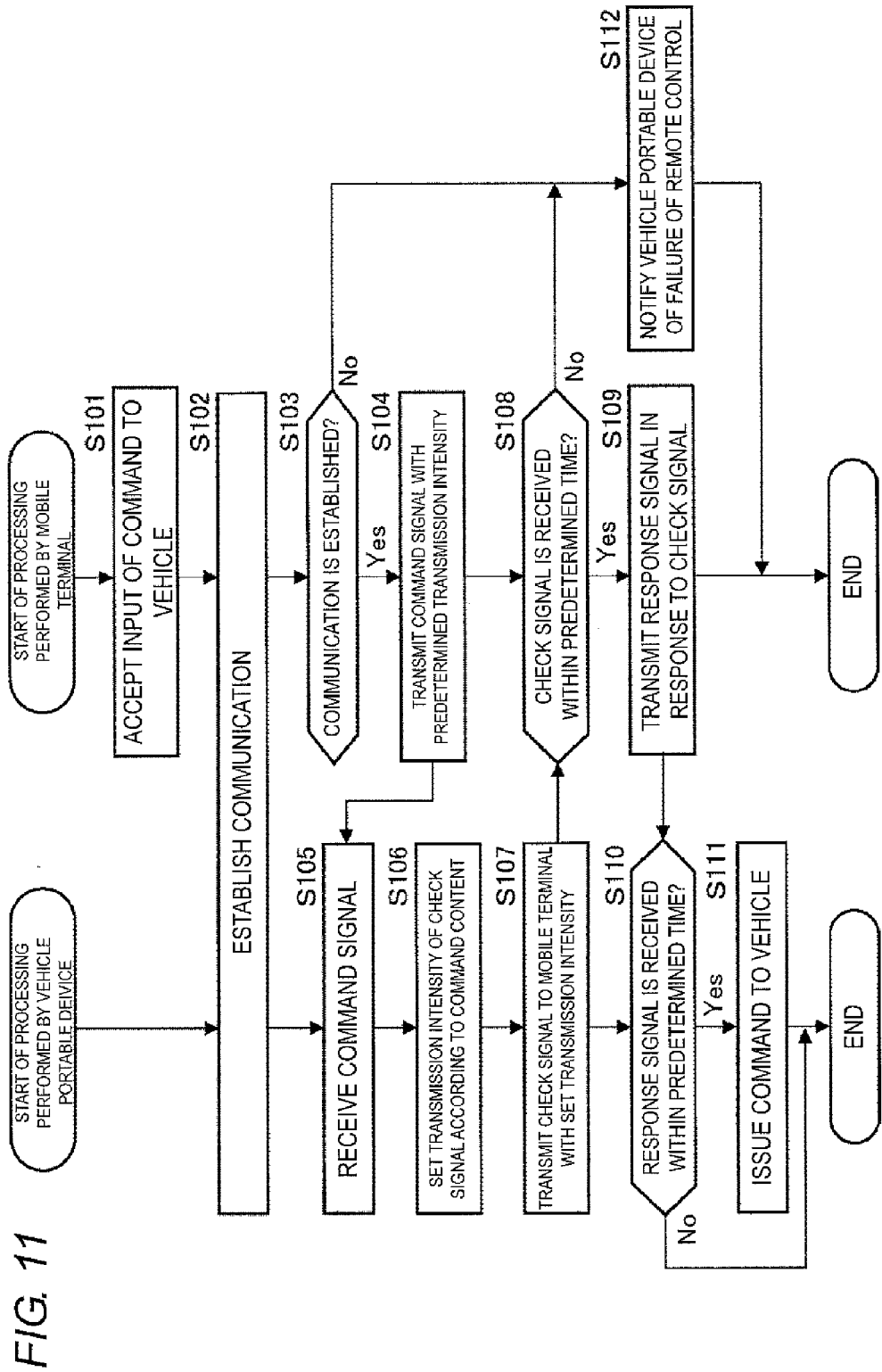
FIG. 11 is a flowchart illustrating a first embodiment of processing when remote control of a vehicle is performed using a mobile terminal.

In Step S151, the input of the command to the vehicle 111 is accepted similarly to the processing in Step S101 in FIG. 11.

In Step S152, the execution controller 252 sets the transmission intensity of the short-range wireless communication part 251 according to the command content inputted by the user.

In Step S153, the short-range wireless communication part 251 establishes the communication with the vehicle portable device 112 similarly to the processing in Step S102 in FIG. 11. At this point, various signals are transmitted from the short-range wireless communication part 251 with the transmission intensity set in Step S153.

In Step S154, the short-range wireless communication part 251 determines whether the communication with the vehicle portable device 112 is established. When it is determined that the communication with the vehicle portable device 112 is established, the processing proceeds to Step S155.

In Step S155, the short-range wireless communication part 251 transmits the command signal to the vehicle portable device 112 with the set transmission intensity.

In Step S156, whether the check signal is received from the vehicle portable device 112 within a predetermined time is determined similarly to the processing in Step S108 in FIG. 11. When it is determined that the check signal is received from the vehicle portable device 112 within the predetermined time, the processing proceeds to Step S157.

In Step S157, the response signal is transmitted to the vehicle portable device 112 similarly to the processing in Step S109 in FIG. 11. Then the processing is ended.

On the other hand, when it is not determined that the communication with the vehicle portable device 112 is established in Step S154, or when it is not determined that the check signal is received within the predetermined time in Step S156, the processing proceeds to Step S158.

In Step S158, the notification of the failure of the remote control is made similarly to the processing in Step S112 in FIG. 11, and the processing is ended.

Thus, for the operation having the high necessary to prevent the third party from performing the remote control, the transmission intensity of the command signal from the mobile terminal 113 is weakened to narrowly set the operable range around the vehicle portable device 112. Accordingly, even if the third party acquires the authentication information of the mobile terminal 113 or the authentication information between the vehicle portable device 112 and the mobile terminal 113, the third party cannot perform the remote control unless the third party possesses the vehicle portable device 112.

On the other hand, for the operation having the low necessary to prevent the third party from performing the remote control, the transmission intensity of the command signal from the mobile terminal 113 is strengthened to widely set the operable range around the vehicle portable device 112. Accordingly, the user can perform the remote control from a position distant from the vehicle portable device 112 to some extent, and the convenience of the user is improved.

In this case, the user may set the transmission intensity of each command from the mobile terminal 113 to vehicle portable device 112. At this point, for example, the transmission distance may be set instead of the transmission intensity for the purpose of easy understanding of the user.

In the flowchart in FIG. 12, the exchanges of the check signal and the response signal may be eliminated between the vehicle portable device 112 and the mobile terminal 113.

2. Modification

Hereinafter, modifications of embodiments of the invention will be described below.

The authentication method between the vehicle 111 and the vehicle portable device 112 and the authentication method between the vehicle portable device 112 and the mobile terminal 113 are not limited to the examples of the embodiment, but any authentication method may be adopted.

The pieces of processing in Steps S1 and S2 in FIG. 5 may be eliminated. For example, the vehicle 111 one-sidedly transmits the ID information and the vehicle information without establishing the communication between the vehicle 111 and the vehicle portable device 112, and the pieces of processing in and after Step S3 may be performed when the vehicle portable device 112 receives the ID information and the vehicle information.

For example, the vehicle 111 may transmit any one of pieces of information on the update deadline, the secret degree, and the transmission intensity to the vehicle portable device 112 together with the vehicle information. Based on the information acquired from the vehicle 111, the vehicle portable device 112 may set the transmission intensity of each piece of vehicle information or determine whether the vehicle information requires the update.

FIG. 6 illustrates the transmission intensity table only by way of example. A table having another configuration may be used. For example, one of the secret degree and the transmission intensity may be deleted. For example, the number of classifications of the secret degrees may be decreased or increased. Furthermore, for example, the secret degree is expressed by a numerical value, and the transmission intensity may be calculated based on the secret degree.

For example, in the case where the transmission intensity is stored in the storage 223 together with the vehicle information, the vehicle portable device 112 may transmit the vehicle information to the mobile terminal 113 with the transmission intensity stored in the storage 223 when the vehicle information is transmitted next time.

A criterion except the secret degree may be used instead of or together with the secret degree to set the transmission intensity with which the vehicle information is transmitted. For example, among the pieces of vehicle information having the same secret degree, the information having higher urgency or importance may be set at stronger transmission intensity such that the mobile terminal 113 can more surely receive the information.

Because it is considered that the vehicle information, which is spontaneously transmitted from the vehicle 111 irrespective of the request from the vehicle portable device 112, is the information that requires to be rapidly transmitted to the user, the transmission intensity of the vehicle information may be set stronger than that of other pieces of vehicle information.

There is no particular limitation to the type of the vehicle 111, but any type of the vehicle may be used.

The programs, which are executed by the vehicle 111, the vehicle portable device 112, and the mobile terminal 113 in order to perform the above pieces of processing, may be programs in which the processing is performed in time series along a procedure described in the embodiments or programs in which the processing is performed in parallel or in necessary timing such that a call is performed.

In the specification, the system means a set of a plurality of constituents (such as a device and a module (a component)) regardless whether all the constituents exist in the same chassis. Accordingly, the system includes a plurality of devices, each of which is accommodated in the individual chassis and connected through a network, and one device in which a plurality of modules are accommodated in one chassis.

The present invention is not limited to the above embodiments, and various changes can be made without departing from the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle portable device comprising:
   a wireless communication part that conducts wireless communication with a vehicle;
   a short-range wireless communication part that conducts short-range wireless communication with a mobile terminal;
   a vehicle information acquisition part that acquires vehicle information on the vehicle, wherein the vehicle information is transmitted from the vehicle by wireless communication;
   a transmission intensity setting part that sets transmission intensity, with which the vehicle information is transmitted to the mobile terminal, according to a content of the vehicle information;
   a transmission controller that performs control such that the vehicle information is transmitted to the mobile terminal with the set transmission intensity by short-range wireless communication; and
   a storage in which the vehicle information is stored,
   wherein, when the mobile terminal makes a request to transmit the vehicle information:
      the vehicle information acquisition part determines whether the requested vehicle information requires an update, acquires the vehicle information that requires the update from the vehicle, and updates the vehicle information stored in the storage, and
      the transmission controller transmits the vehicle information acquired from the vehicle by the vehicle information acquisition part to the mobile terminal with respect to the vehicle information that requires the update, and transmits the vehicle information stored in the storage to the mobile terminal with respect to the vehicle information that does not require the update.

2. The vehicle portable device according to claim 1, wherein
   the vehicle information acquisition part stores the transmission intensity set to the vehicle information in the storage together with the vehicle information, and
   the transmission controller transmits the vehicle information stored in the storage to the mobile terminal with the transmission intensity stored in the storage.

3. The vehicle portable device according to claim 2, wherein the transmission intensity setting part sets the transmission intensity based on a secret level of the vehicle information.

4. The vehicle portable device according to claim 2, wherein the transmission intensity setting part sets the transmission intensity of the vehicle information, which is transmitted from the vehicle irrespective of a request from the vehicle portable device, stronger than the transmission intensity of the vehicle information, which is transmitted from the vehicle by the request from the vehicle portable device.

5. The vehicle portable device according to claim 2, wherein the transmission intensity setting part sets transmission intensity of information on a position of the vehicle to the weakest.

6. The vehicle portable device according to claim 2, further comprising:
   a command relay part that controls transmission of a command to the vehicle, the command being transmitted from the mobile terminal,
   wherein the transmission intensity setting part sets transmission intensity of a check signal, which is transmitted to the mobile terminal in response to the command, according to a content of the command,
   wherein the transmission controller transmits the check signal to the mobile terminal with the set transmission intensity, and
   wherein the command relay part transmits the command to the vehicle when receiving a response signal, which is transmitted from the mobile terminal in response to the check signal.

7. The vehicle portable device according to claim 1, wherein the transmission intensity setting part sets the transmission intensity based on a secret level of the vehicle information.

8. The vehicle portable device according to claim 7, wherein the transmission controller transmits the plurality of pieces of vehicle information to the mobile terminal at different timing for each group that is classified by the secret level.

9. The vehicle portable device according to claim 1, wherein the transmission intensity setting part sets the transmission intensity of the vehicle information, which is transmitted from the vehicle irrespective of a request from the vehicle portable device, stronger than the transmission intensity of the vehicle information, which is transmitted from the vehicle by the request from the vehicle portable device.

10. The vehicle portable device according to claim 1, wherein the transmission intensity setting part sets transmission intensity of information on a position of the vehicle to the weakest.

11. The vehicle portable device according to claim 1, further comprising:
    a command relay part that controls transmission of a command to the vehicle, the command being transmitted from the mobile terminal,
    wherein the transmission intensity setting part sets transmission intensity of a check signal, which is transmitted to the mobile terminal in response to the command, according to a content of the command,
    wherein the transmission controller transmits the check signal to the mobile terminal with the set transmission intensity, and
    wherein the command relay part transmits the command to the vehicle when receiving a response signal, which is transmitted from the mobile terminal in response to the check signal.

12. An information communication system comprising:
    a vehicle portable device that conducts wireless communication with a vehicle; and
    a mobile terminal that includes a display part and conducts near-field wireless communication with the vehicle portable device,
    wherein the vehicle portable device includes:
       a vehicle information acquisition part that acquires vehicle information on the vehicle, wherein the vehicle information is transmitted from the vehicle by wireless communication;
       a transmission intensity setting part that sets transmission intensity, with which the vehicle information is transmitted to the mobile terminal, according to a content of the vehicle information; and
       a transmission controller that performs control such that the vehicle information is transmitted to the mobile terminal with the set transmission intensity by short-range wireless communication, and
    wherein the mobile terminal includes an execution controller that acquires the vehicle information transmitted from the vehicle portable device and controls execution of processing of displaying the vehicle information on the display part, wherein the transmission intensity setting part sets the transmission intensity of the vehicle information based on a secret level of the vehicle information, and wherein the secret level is transmitted from the vehicle together with the vehicle information.

13. The information communication system according to claim 12, wherein the mobile terminal further includes an operation part that inputs a command to the vehicle, and the execution controller sets the transmission intensity of the command transmitted to the vehicle portable device based on a content of the command, and transmits the command to the vehicle portable device with the set transmission intensity by short-range wireless communication.

14. The information communication system according to claim 8, wherein the information communication system is configured such that the transmission intensity of the command from the mobile terminal to the vehicle portable device are set by a user.

* * * * *